(12) United States Patent
Glenn et al.

(10) Patent No.: US 8,357,645 B2
(45) Date of Patent: Jan. 22, 2013

(54) SEMI-RIGID GEL CLEANSING ARTICLE AND USES THEREOF

(75) Inventors: Gregory M. Glenn, American Canyon, CA (US); Serena Stephenson, El Cerrito, CA (US); Nikita R. Manalo, Santa Clara, CA (US); David Lestage, Livermore, CA (US); Marc Privitera, Walnut Creek, CA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 144 days.

(21) Appl. No.: 12/055,667

(22) Filed: Mar. 26, 2008

(65) Prior Publication Data

US 2009/0312215 A1 Dec. 17, 2009

Related U.S. Application Data

(60) Provisional application No. 60/920,696, filed on Mar. 28, 2007.

(51) Int. Cl.
| | | |
|---|---|---|
| *C11D 17/00* | (2006.01) | |
| *C11D 3/00* | (2006.01) | |
| *C11D 3/02* | (2006.01) | |
| *C11D 3/22* | (2006.01) | |
| *A61K 8/02* | (2006.01) | |
| *B08B 7/00* | (2006.01) | |

(52) U.S. Cl. ........ 510/130; 510/158; 510/160; 510/221; 510/280; 510/336; 510/383; 510/396; 510/403; 510/473; 510/474; 510/505; 510/511; 424/484; 424/485; 424/488; 8/137; 134/42

(58) Field of Classification Search .................. 510/403, 510/158, 221, 280, 336, 383, 396, 473, 474, 510/505, 130, 160, 511; 8/137; 134/42; 424/484, 485, 488
See application file for complete search history.

(56) References Cited

U.S. PATENT DOCUMENTS

| | | | | |
|---|---|---|---|---|
| 2,356,168 | A * | 8/1944 | Mabley | 510/151 |
| 4,188,447 | A * | 2/1980 | Ehlenz | 442/76 |
| 4,239,632 | A * | 12/1980 | Baile | 508/150 |
| 5,958,589 | A * | 9/1999 | Glenn et al. | 428/402.2 |
| 6,106,849 | A * | 8/2000 | Malkan et al. | 424/401 |
| 2003/0099692 | A1* | 5/2003 | Lydzinski et al. | 424/443 |
| 2004/0048759 | A1* | 3/2004 | Ribble et al. | 510/141 |
| 2005/0118237 | A1* | 6/2005 | Krzysik et al. | 424/443 |
| 2005/0137272 | A1* | 6/2005 | Gaserod et al. | 521/50 |

\* cited by examiner

*Primary Examiner* — Lorna M Douyon (74) *Attorney, Agent, or Firm* — Elizabeth R. Sampson; John D. Fado; Lesley Shaw (57) ABSTRACT

The present invention relates to semi-rigid gels, methods of manufacture and uses thereof.

24 Claims, 3 Drawing Sheets

FIG. 3

SEMI-RIGID GEL CLEANSING ARTICLE AND USES THEREOF

CROSS REFERENCE TO RELATED APPLICATIONS

This application claims priority to U.S. Provisional Patent Application Ser. No. 60/920,696, filed Mar. 28, 2007 which is herein incorporated by reference in its entirety.

BACKGROUND OF THE INVENTION

Cleansing and conditioning products are marketed in a variety of forms. Single use disposable articles are one common form of cleaning article. Another popular type of cleaning article comprises a cleaning/sanitizing agent in the form of a solution or soft gel which is packaged in a glass or plastic dispenser.

Single use disposable articles typically comprise a woven or non-woven cloth upon which is deposited a cleaning composition. Fiber absorbent cleaning articles designed for single use are convenient, and represent a more sanitary alternative to the use of sponges, washcloths, or other cleansing implements intended for multiple reuse. Unfortunately however, fiber based single use cleaning articles must be discarded after use. Thus, they create solid waste garbage.

The creation of solid waste causes numerous problems, including increased solid waste deposited in landfills, as well as simple litter. Indeed, the U.S. already sends about 129 million tons of municipal solid waste to landfills each year, and landfill space is running out. Moreover, environmental problems associated with landfills make the landfills undesirable for most neighborhoods. Thus, reducing the need for solid waste disposal is a laudable goal.

Despite the desirability for reduction in the amount of solid waste sent to landfills, solid waste, such as spent, fiber based, single use cleaning articles, only make it to a landfill if disposed of properly. Indeed, because spent cleaning articles require disposal the user must have ready access to a garbage receptacle, or must search for one. In some cases, the inconvenience and frustration encountered in having to search for a garbage receptacle causes users to simply litter the ground with the spent wipe, thereby contributing to pollution.

Cleaning/sanitizing materials in the form of cleaning solutions or a soft cleansing gel packaged in a glass or plastic dispenser, fortunately does not generate solid waste with each use. Unfortunately however, packaged cleansing gels have their own set of problems. For example, pouring or squeezing cleaning/sanitizing materials from a bottle or other container often results in inconsistent dosage, especially when children dispense the liquid or gel. Moreover, despite the fact that the liquids or soft gels may more or less effectively loosen dirt and debris from the hands, there is no wiping material to remove the dirt and debris. Thus, the dirt simply stays on the hands. In some cases, especially, but not exclusively with children, a user having no wiping material will, after using a cleaning gel, wipe their hands on their clothing, thus soiling their clothes.

Therefore, a need exists in the art for a cleaning article that is effective for cleaning surfaces, which provides a consistent and reliable dose of cleansing material and a wiping surface, but which does not generate significant amounts of solid waste. Amongst other virtuous attributes, such a cleaning article would be both convenient and environmentally sound.

Fortunately, as will be clear from the following disclosure, the present invention provides for these and other needs.

SUMMARY OF THE INVENTION

In one embodiment, the present invention provides a semi-rigid gel article that comprises at least one gelling agent, at least one solvent, and at least one cleaning agent, wherein the semi-rigid gel cleansing article is of a sufficient mechanical strength to allow the entire gel to be picked up without breaking or smearing, and wherein the at least one gelling agent forms a solid matrix that is able to hold solids, liquids or solutions.

In one exemplary embodiment, the semi-rigid gel article is a cleaning article.

In another exemplary embodiment the cleaning article is used to clean and/or sanitize human skin.

In another exemplary embodiment the cleaning article is used to clean and/or sanitize a surface. In one exemplary embodiment, the surface is a wall. In another exemplary embodiment the surface is the surface of an article of clothing.

Other features, objects and advantages of the invention will be apparent from the detailed description which follows.

DETAILED DESCRIPTION OF THE INVENTION

Definitions

Unless defined otherwise, all technical and scientific terms used herein generally have the same meaning as commonly understood by one of ordinary skill in the art to which this invention belongs.

As used herein, the term "semi-rigid gel" refers to a solid liquid gel system comprising a solid porous matrix, wherein the pores are at least partially filled with a liquid. Thus, a "semi-rigid gel article" is an article or item comprising a semi-rigid gel. Typically, the solid porous matrix of a "semi-rigid gel" comprises a solid or semi-solid gelling agent. In some embodiments, the matrix further comprises incorporated active particles, e.g., abrasives, hulls, calcium carbonate and/or beads or beadlets filled with an active substance e.g., antimicrobial agents other actives e.g., one or more fragrances, colors, abrasives, surfactants, emollients or etc. Pores of a semi-rigid gel are at least partially filled with a liquid or solvent. The liquid or solvent can be a pure liquid, a mixture of one or more liquids, or a solution. Indeed, a "semi-rigid gel" typically comprises a large proportion of liquid. In some embodiments, the liquid further comprises active particles e.g., abrasives, and/or beads or beadlets filled with an active substance e.g., antimicrobial agents other actives e.g., one or more fragrances, colors, abrasives, surfactants, emollients or etc. In other embodiments, the actives are dissolved in the liquid or solvent.

Although a "semi-rigid gel" typically comprises a large proportion of liquid, it is sufficiently solid to maintain a defined structure, e.g., a "semi-rigid gel" is not deformed by and/or does not take up the shape of its contents. However, a semi-rigid gel also has sufficient pliability to conform to whatever curvature may be presented to it. Thus, a "semi-rigid gel" is flexible yet resilient. Typically, a "semi-rigid gel" provides a firm support for actions such as e.g., contacting a surface and/or wiping against, but is capable of disintegrating or dissolving when contacted or wiped repeatedly in conjunction with the application of appropriate pressure.

In one exemplary embodiment, the solidity of a "semi-rigid gel" is appreciated by picking up a semi-rigid gel and observing that the gel does not break or smear. Indeed, a semi-rigid gel typically does not have the consistency of "jelly" and thus, is not amenable to scooping.

The term "gelling agent" as used herein, refers to a substance that, when mixed under appropriate conditions with a liquid e.g., water or other aqueous liquid, converts the liquid from a flowable liquid to a moldable solid, semi-solid, or gel. Exemplary appropriate mixing conditions comprise mixing of a "gelling agent" in sufficient proportion with liquid to form a mixture, the application of appropriate temperatures to the mixture, followed by cooling of the heated mixture. As is known in the art, appropriate mixing conditions will vary with the particular gelling agent, the liquid and/or with the particular combination of liquid and gelling agent. Exemplary "gelling agents" include, but are not limited to: starch, agar, alginate, proteins, silica etc and/or mixtures thereof. Typically, a gelling agent comprises the solid phase of a semi-rigid gel.

The term "starch" as used herein refers to a carbohydrate compound having the formula $(C_6H_{10}O_5)_n$, where the subscript "n" denotes the total number of glucose monomer units. Typically, starches comprise the polysaccharides amylose and amylopectin. The amylose polysaccharide is comprised primarily of glucose monomer units joined to one another in α-1,4 linkages. Amylose is typically considered a linear molecule, however some minor branching is occasionally found. Typically, amylose polymers range in length from between about 500 to about 20,000 glucose monomer units, but any length is possible. Amylopectin is also comprised of glucose monomer units, but is not usually considered to be a strictly linear molecule. Instead, the polysaccharide comprises α-1,4 linked glucose monomers interspersed at intervals with branches formed by glucose monomers in α-1,6 linkage (see e.g., Advances in Food and Nutrition Research, Vol. 41: *Starch: Basic Science to Biotechnology*, Mirta Noemi Sivak and Jack Preiss eds. Academic Press (1998) which is incorporated herein by reference in its entirety).

The relative content of amylose and amylopectin in starch can vary. Typically, amylose comprises about 20% to about 25% to about 30% of the starch, but may be present in higher concentrations as well. For example "high-amylose corn starch" (HACS) comprises at least about 40% amylose, and in some embodiments comprises about 50%, about 55%, about 60%, about 65%, about 70%, about 75% amylose, and in other embodiments comprises about 80% amylose or about 85% amylose. Amylopectin on the other hand, typically comprises about 70% to about 75%, to about 80% of the starch, but may occur in higher proportions or lower proportions as well, e.g., waxy corn starch may comprise more than 99% amylopectin, and HACS may comprise as little as 15% amylopectin or less.

Starch is found in nearly every type of plant tissue including, but not limited to the fruit, seeds, stems, leaves, rhizomes and/or tubers. Thus, many starches are plant derived starches or "plant starch". Typically, starch produced in the USA is derived from corn, potatoes, rice, and wheat. However, useful starches can come from any source e.g., seaweed, arrowroot, guar gum, locust bean, tapioca, arracacha, buckwheat, banana, barley, cassava, konjac, kudzu, oca, sago, sorghum, sweet potato, taro, yams and beans e.g., favas, lentils and peas.

The term "starch" as used herein, also refers to "modified starch" which has been modified by human intervention such that it differs from the raw, unmodified form as extracted from a plant. For example, starch can be modified by methods known in the art such as e.g., by inter alia chemical crosslinking and/or by stabilization through the introduction of anionic groups to the starch granule.

The term "agar", "agar-agar" or equivalent expressions as used herein refers to a galactose-based polysaccharide extract of certain seaweeds. "Agarose," is the neutral gelling fraction of agar (the other fraction being a sulfated non-gelling fraction "agaropectin"). Agar is an exemplary gel-forming polysaccharide. Agar is insoluble when dispersed as a dry solid in water at low temperatures. However, agar becomes soluble when heated to temperatures that are typically between about 70° C. to about 95° C. and forms a gel upon cooling. Agar gels are stable to both pH and moderate elevation of temperature.

The term "alginate" as used herein refers to any derivative of alginic acid (e.g. calcium, sodium, or potassium salts or propylene glycol alginate). Alginate is a family of unbranched binary copolymers of (1,4) linked β-D-mannurinic acid (M) and α-L-guluronic acid (G) residues of widely varying composition and sequence. The term alginate used herein comprises any purification level, from technical grade alginate containing low amounts of alginate all the way through ultra purified grades, of a polymer with the chemical composition outlined above. The term alginate also comprises any natural occurring polymer, both from brown seaweeds and from bacterial origin, and enzymatically modified alginate. Thus, the term "alginate" as used herein refers broadly to all alginic compounds, the acid and its salts, including the insoluble alginic acid and polyvalent salts of alginates, and the soluble alginates including alkali metallic alginates, Mg-alginate and other soluble derivatives of alginic acid, such as propylene glycol alginate.

"Alumina" as used herein means the use of, for example, aluminum oxide to synthetically make alumina gels.

The terms "polypeptide," "peptide" and "protein" are used interchangeably herein to refer to a polymer of amino acid residues. The terms apply to both naturally occurring amino acid polymers and non-naturally occurring amino acid polymers. As used herein, the terms encompass amino acid chains of any length, including full-length proteins (e.g., gelatin), wherein the amino acid residues are covalently linked through peptide bonds.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refer to compounds that have the same basic chemical structure as a naturally occurring amino acid, i.e., an α-carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds that have a structure that is different from the general chemical structure of an amino acid, but which functions in a manner similar to a naturally occurring amino acid. Amino acids are referred to herein by either the commonly known three letter symbols or by the one-letter symbols recommended by the IUPAC-IUB Biochemical Nomenclature Commission. Exemplary proteins that find use as gelling agents include, but are not limited to gelatin and albumin.

The term "essential oil" as used herein refers to natural substances made by plants. Essential oils are found in many aromatic plants-herbs, flowers, and trees and are present in various parts of the plant including, but not limited to leaves, seeds, flowers, wood and bark. Typically, essential oils give the plant its particular signature scent. For example, oils such as lemon, orange, mustard, and anise give fruits and seeds their characteristic odor and taste. In Nature, the essential oils of plants have numerous functions for the plant which include, but are not limited to e.g., attracting bees for pollination, repelling insects, and/or protecting the plant from disease. Humans have invented many uses for essential oils including, but not limited to e.g., pesticides e.g., neem oil; insect and animal repellents e.g., citronella oil; food flavorings e.g., methyl salicylate (oil of wintergreen); fragrances e.g., lemon oil; and therapeutics e.g., lavender oil.

The term "alcohol" as used herein, refers to a chemical compound of the formula R—OH, wherein R is an alkyl, aryl, substituted alkyl or substituted aryl group. A "lower alcohol" refers to an alkane, alkene, or alkyne of one to six carbon atoms substituted with at least one hydroxyl group.

The term "ketone" as used herein, refers to a chemical compound of the formula R—(CO)—R', Wherein R is an alkyl, aryl, substituted alkyl or substituted aryl group and wherein R' is an alkyl, aryl, substituted alkyl or substituted aryl group that is the same or different than R.

The term "alkyl," is used in the conventional sense. Thus, the term "alkyl," by itself or as part of another substituent means, unless otherwise stated, a straight or branched chain, or cyclic hydrocarbon radical, or combination thereof, which may be fully saturated, mono- or polyunsaturated and can include di- and multivalent radicals, having the number of carbon atoms designated (e.g., $C_1$-$C_{10}$ meaning one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Exemplary unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl".

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," is used in the conventional sense. Thus, the term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Exemplary "heteroalkyl" groups include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—CH-3, —$CH_2$—$CH_2$,—S(O)—$CH_3$, —$CH_2$—$CH_2$—S(O)$_2$—$CH_3$, —CH=CH—O—$CH_3$, —Si($CH_3$)$_3$, —$CH_2$—CH=N—O$CH_3$, and —CH=CH—N($CH_3$)—$CH_3$. Up to two heteroatoms may be consecutive, such as, for example, —$CH_2$—NH—O$CH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)2R'— represents both —C(O)2R'— and —R'C(O)$_2$—.

Each of the above terms (e.g., "alkyl," and "heteroalkyl,") is meant to include both substituted and unsubstituted forms of the indicated radical. Exemplary substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring.

For example. —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

The term "aryl" means, unless otherwise stated, a polyunsaturated, typically aromatic, hydrocarbon substituent which can be a single ring or multiple rings (up to three rings) which are fused together or linked covalently. The term "heteroaryl" refers to aryl groups (or rings) that contain from one to four heteroatoms selected from the group consisting of N, O, and S, wherein the nitrogen and sulfur atoms are optionally oxidized, and the nitrogen atom(s) are optionally quatemized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 2-quinolyl, 3-quinolyl, 4-quinolyl, 5-quinolyl, 6-quinolyl, 7-quinolyl and 8-quinolyl. Substituents for each of the above noted aryl and heteroaryl ring systems are selected from the group consisting of the group of acceptable substituents described below.

Substituents for the aryl and heteroaryl groups are varied and are selected from the group consisting of: -halogen, —OR', —OC(O)R', —NR'R", —SR', —R', —CN, —$NO_2$, —$CO_2$R', —CONR'R", —C(O)R', —OC(O)NR'R", —NR"C(O)R', —NR"C($O)_2$R', —NR'—C(O)NR"R'", —NH—C($NH_2$)=NH, —NR∝C($NH_2$)=NH, —NH—C($NH_2$)=NR', —S(O)R', —S($O)_2$R', —S($O)_2$NR'R", —$N_3$, —CH(Ph)$_2$, perfluoro($C_1$–$C_4$)alkoxy, and perfluoro($C_1$–$C_4$)alkyl, in a number ranging from zero to the total number of open valences on the aromatic ring system; and where R', R" and R'" are independently selected from the group consisting of hydrogen, ($C_1$–$C_8$)alkyl and heteroalkyl, unsubstituted aryl and heteroaryl, (unsubstituted aryl)-($C_1$–$C_4$)alkyl, and (unsubstituted aryl)oxy-($C_1$–$C_4$)alkyl.

Two of the substituents on adjacent atoms of the aryl or heteroaryl ring may optionally be replaced with a substituent of the formula -T-C(O)—($CH_2$)$_q$—U—, wherein T and U are independently —NH—, —O—, —$CH_2$— or a single bond, and q is an integer of from 0 to 2. Alternatively, two of the substituents on adjacent atoms of the aryl or heteroaryl ring may optionally be replaced with a substituent of the formula -A-(CH2)r-B—, wherein A and B are independently —$CH_2$—, —O—, —NH—, —S—, —S(O)—, —S($O)_2$—, —S($O)_2$NR'— or a single bond, and r is an integer of from 1 to 3. One of the single bonds of the new ring so formed may optionally be replaced with a double bond. Alternatively, two of the substituents on adjacent atoms of the aryl or heteroaryl ring may optionally be replaced with a substituent of the formula —($CH_2$)$_s$—X—($CH_2$)$_t$—, where s and t are independently integers of from 0 to 3, and X is —O—, —NR'—, —S—, —S(O)—, —S($O)_2$—, or —S($O)_2$NR'—. The substituent R' in —NR'— and —S($O)_2$NR'— is selected from the group consisting of hydrogen or unsubstituted ($C_1$–$C_6$)alkyl.

As used herein, the term "heteroatom" is meant to include oxygen (O), nitrogen (N), sulfur (S) and silicon (Si).

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical, unless otherwise indicated.

The term "water-miscible" as used herein refers to substances that have at least some degree of miscibility in water. For example, a water miscible liquid or water miscible solvent is typically at least partially miscible with water. In an exemplary embodiment, a water miscible solvent has a solubility of at least about 50 parts by weight per 100 parts by weight of water. In other exemplary embodiments, a water miscible liquid or water miscible solvent has a solubility of at least about 100 parts by weight per 100 parts by weight of water. In other exemplary embodiments a water miscible solvent is miscible with water in all proportions. Thus, a "water-miscible solvent" is capable of being mixed with, and forming a continuous single phase with water. Exemplary water miscible solvents include, but are not limited to water, ethanol, isopropanol, acetic acid, dimethylsulfoxide, acetone, propylene glycol, etc.

The term "cleanse" or "clean" as used herein refers to cleaning an object or a surface so as to free that object or surface from unwanted substances including, but not limited to dirt, stains, marks, germs/microorganisms/viruses, etc. Indeed, the term "cleanse" or "clean" refers to any indicia of success in cleaning an object or surface, including any objective or subjective parameter such as visual appearance, improved smell/odor, improved sense of cleanliness or well-being, reduction or elimination of bacterial or pathogen count, disinfection, prevention or inhibition of disease, and the like.

Thus, the term "cleansing agent" or "cleaning agent" or any grammatically equivalent term or expression as used herein refers to any agent, preparation, composition, solution or the like that facilitates cleaning. Thus, a cleaning agent includes but is not limited to surfactants such as e.g., detergents e.g., sodium laurel sulfate and surfactants as disclosed in e.g., U.S. Pat. No. 6,951,834, U.S. Pat. No. 7,148,187 and U.S. Pat. No. 6,699,825. Cleaning agents also include, but are not limited to stain removers, soaps, and sanitizing agents e.g., antimicrobial agents, chlorine, etc.

The term "sanitize" as used herein refers to cleaning which is directed particularly toward the killing of microorganisms e.g., bacteria, fungi, molds, mildew, and/or viruses and etc. Thus, "sanitizing" is a special form of cleaning. Similarly, a "sanitizing agent" is a special type of "cleaning agent" whose use is directed toward the killing of microorganisms. Some exemplary "antimicrobial agents" are disclosed in e.g., Chambers and Sande, *Antimicrobial Agents: General Considerations*, In Goodman & Gilman's *The Pharmacological Basis of Therapeutics*, Hardman and Limbard eds., (1996).

The term "effective amount" or "an amount effective to" or any grammatically equivalent term or expression, means the amount that, when utilized in a semi-rigid gel article for cleaning or sanitizing a surface or object, is sufficient to effect a desired result e.g., "cleaning" and/or "sanitizing" or lubricating of a surface or object. The desired result may comprise a subjective or objective improvement. In some embodiments, the term "effective amount" or "amount effective to" refers to the amount of pressure that, when applied to a semi-rigid gel contacted against a surface, is the appropriate pressure effective to cause the semi-rigid gel to at least begin to release a cleaning agent from within.

The term "biodegradable" as used herein refers to a composition or substance that decays and becomes absorbed by the environment. A biodegradable substance is capable of decaying through the action of living organisms typically, through the action of living organisms such as bacteria and fungi. Biodegradation of biodegradable substances such as food and sewage, typically leads to compaction and liquefaction, and to the release of nutrients that are then recycled by the ecosystem.

The term "solvent" as used herein refers to a liquid that is capable of dissolving a solid, liquid, or gaseous solute, resulting in a solution. In some embodiments a "solvent" is a liquid that is a single chemical entity. In other exemplary embodiments a "solvent" is a mixture of one or more liquids.

The phrase "the semi-rigid gel degrades to small pieces" as used herein means that when compressed with appropriate pressure by contacting a surface e.g. skin, hard surfaces e.g., countertops, floors, automobile or truck surfaces etc., a semi-rigid gel disintegrates such that it effectively disappears. In some embodiments, the phrase "degrades to small pieces" refers to small pieces that are visible to the naked eye. In other embodiments "degrades to small pieces" refers to pieces so small that contacting of the semi-rigid gel article appears to cause the semi-rigid gel article to dissolve or deliquesce.

The phase "appropriate pressure" as used herein refers to the amount of pressure that, when applied to a semi-rigid gel contacted against a surface is an amount of pressure that provides "sufficient compression" effective to cause the semi-rigid gel to at least begin to release a cleaning agent from within.

The phrase "removing the small pieces from the surface" as used herein refers to any method known for removing small particles from a surface, including, but not limited to brushing off, wiping away, blowing off with air, rinsing with water, etc.

1. Introduction: Semi-Rigid Gels

Semi-rigid gels are fascinating materials. One of the many interesting properties of semi-rigid gels is that the liquid weight of a semi-rigid gel is typically at least several times the solid weight of the semi-rigid gel. As will be disclosed in detail below, it has now been discovered that a semi-rigid gel can be formed into an article that provides a delivery system for cleansing agents, e.g., cleaning and/or sanitizing solutions, which degrade to small pieces and/or dissolve when contacted against a surface with appropriate pressure thereby releasing the cleansing agent. The semi-rigid gel article can vary in the degree of solidity, and thus can be used make a variety of semi-rigid gel articles that are appropriate for cleaning a variety of surfaces e.g., cleaning skin, e.g., hands, hard surfaces e.g., counter tops, walls, floors, automobiles, trailers, etc, and/or textiles e.g., clothing, rugs etc. Contacting the semi-rigid gel article against the surface to be cleaned provides sufficient compression to release the cleaning agents from the semi-rigid gel. Continued contacting and/or compression reduces the gel solids to a very small residue, such that the small residue can simply be wiped off the hands and discarded on site. In some embodiments, the residue is so small and so reduced that the gel solids and thus the semi-rigid gel itself, are seen to disappear, dissolve, or deliquesce.

Thus, in an exemplary embodiment, the invention provides a semi-rigid gel article comprising at least one gelling agent, at least one solvent and at least one cleaning agent, wherein the semi-rigid gel article is of sufficient mechanical strength to allow the entire gel to be picked up without breaking or smearing and wherein the at least one gelling agent forms a solid matrix that is able to hold solids, liquids or solutions. The semi-rigid gel article may comprise any suitable gelling agent. For example, in one exemplary embodiment, the semi-rigid gel comprises starch. In another exemplary embodiment, the semi-rigid gel comprises agar. In still another exemplary embodiment, the semi-rigid gel comprises alginate.

Typically, semi-rigid gel articles are made from aqueous gels (aquagels) by displacing the water within the pore structure of the aqueous gel with a specified liquid or solvent(s). See e.g., S. S. Kistler (1932) J. Phys. Chem. 34:52. In an exemplary embodiment, the displacement of water in the aqueous gel by a specified solvent(s) is achieved using a solvent exchange protocol.

In one exemplary embodiment, the solvent exchange protocol comprises placing an aqueous gel in a solvent or solution that is miscible with water e.g., water itself, an aqueous solution comprising a surfactant or an antimicrobial, ethanol, isopropanol, acetone etc. Thus, in an exemplary embodiment, the semi-rigid gel article comprises a water miscible solvent. The solvent can be changed as many times as necessary to achieve the desired degree of solvent exchange e.g., the solvent can be changed once, twice, three times, or more, or not at all. In some exemplary embodiments, the solvent is replaced one or more times with the same solvent. In other exemplary embodiments the identity of the solvent is changed with one or more of the solvent changes.

In still other exemplary embodiments, the water within the pore structure of the aqueous gel is exchanged one or more times with one or more water miscible solvent(s) that are also miscible with a water immiscible solvent. After exchange with the water miscible solvent is complete, further solvent exchanges can be carried out with water immiscible solvent(s). Thus, in another exemplary embodiment, the semi-rigid gel article comprises a water immiscible solvent.

In some exemplary embodiments, semi-rigid gels further comprise one or more other additives e.g., including but not limited to one or more of fragrances, abrasives, detergents, surfactants, enzymes, disinfectants, anesthetics, colorants, flame suppressants, flash-point suppressants, color change indicators, insect repellants, pharmaceuticals, preservatives, skin conditioners, sunscreen agents, and/or vitamins.

Figure 1:
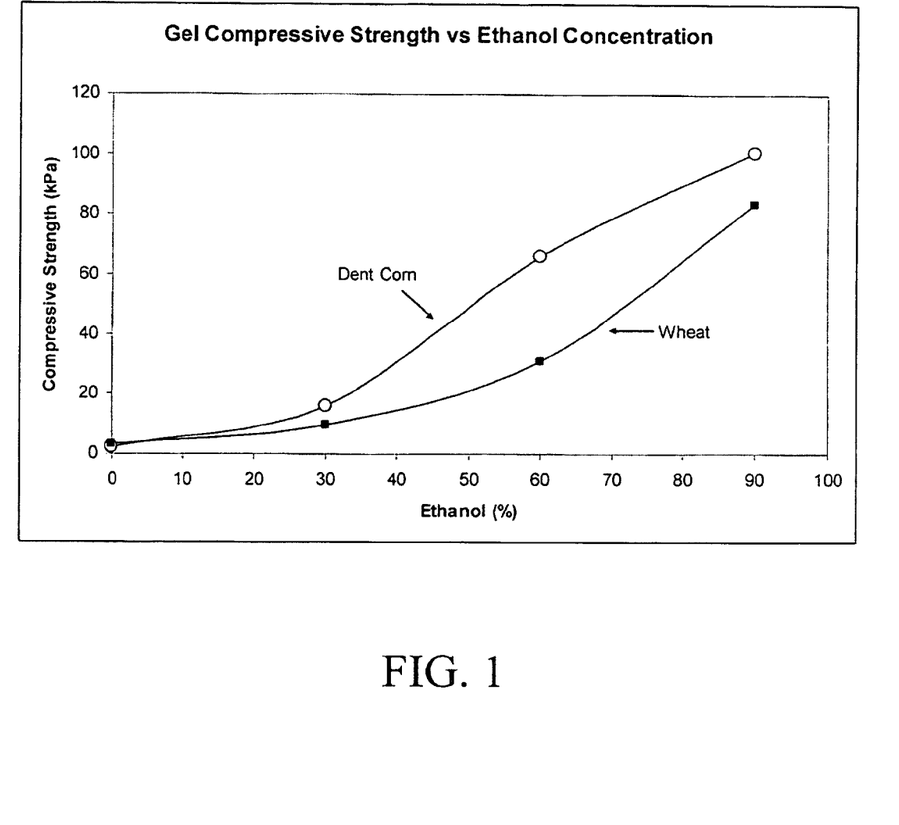
FIG. 1. Compressive strength of wheat and Dent corn starch gels as a function of ethanol concentration. Gel strength varies with the ethanol concentration and type of starch used for the gel. The corn starch gels were slightly stronger than the wheat starch gels at ethanol concentrations of 30% or higher.
Figure 2:
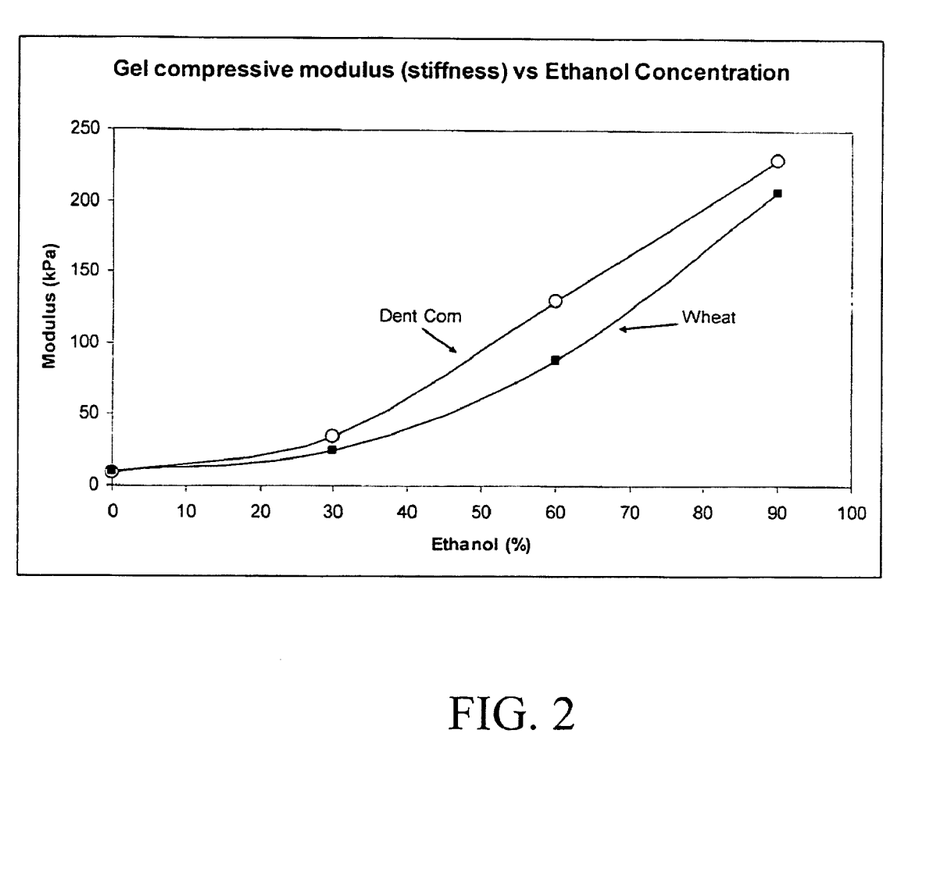
FIG. 2. Compressive modulus (stiffness) of wheat and Dent corn starch gels as a function of ethanol concentration. Gel stiffness varies with the type of starch used for the gel. Typically corn starch gels were slightly stiffer than the wheat starch gels at ethanol concentrations of 30% or higher.
Figure 3:
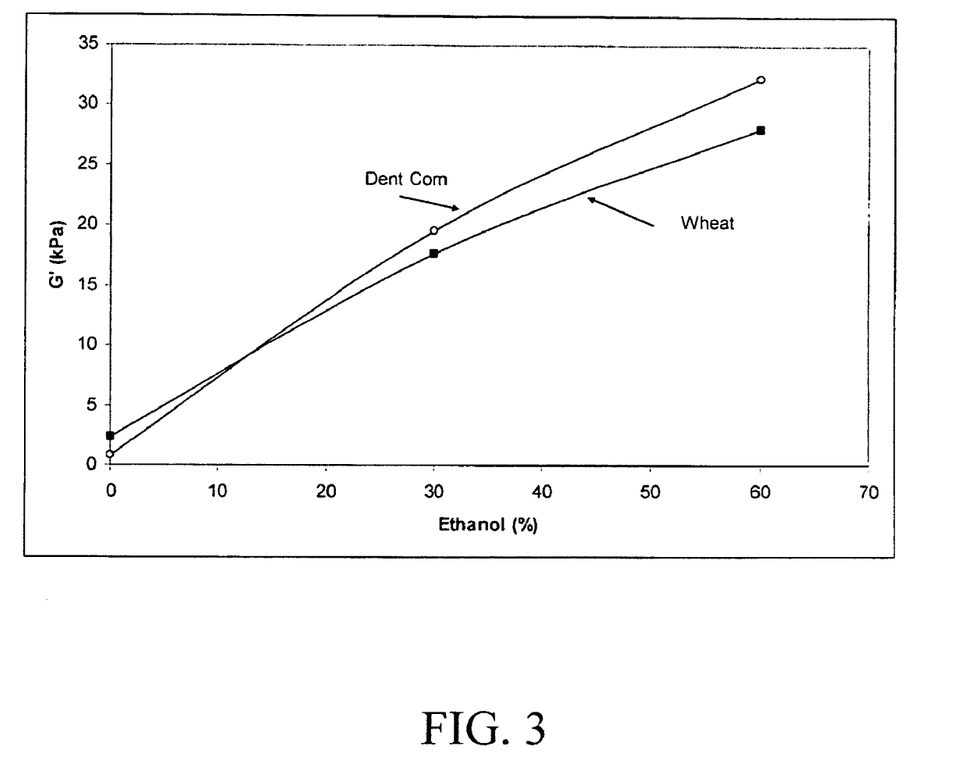
FIG. 3. Dynamic modulus of wheat and Dent corn starch gels as a function of ethanol concentration as measured by rheometry.

The rigidity or solidity of a semi rigid gel article is influenced by the nature and/or concentration of the solvent that fills the pores, as well as by the nature of the gelling agent (see e.g., FIGS. 1-3). Thus, semi-rigid gels can be varied in their degree of solidity/rigidity. Solidity/rigidity is typically seen by observing that the entire gel can be picked up without breaking or smearing. The rigidity or solidity of such a semi-rigid gel article can be numerically determined by measuring e.g., the compressive strength, the compressive modulus, and/or the dynamic modulus using methods disclosed herein, and/or by using other methods known in the art (see e.g., U.S. Pat. No. 4,794,788).

Semi-rigid gels have numerous uses including, but not limited to, providing cleansing systems for human and/or animal skin, clothes, furniture and/or other surfaces e.g., walls, countertops, floors, etc. Thus, in another exemplary embodiment, the invention provides a method for cleaning a surface. The method comprises obtaining a semi-rigid gel article and contacting the semi-rigid gel article with a surface thereby releasing the at least one cleaning agent, continuing contacting until the semi-rigid gel article degrades to small pieces, and if necessary, removing the small pieces from the surface, thereby cleaning the surface.

II. Gelling Materials

Numerous gelling materials are known in the art (see e.g., S. S. Kistler, 1932 supra, and Glenn, G. M. et al., (1998) Industrial Crops and Products 8:123-132). Any material that will form a firm aquagel is suitable for the production of a semi-rigid gel article. Some exemplary gelling materials are discussed below.

A. Starches

Starch is a complex plant carbohydrate used by plants to store excess glucose. All plants make starch. Starch typically occurs as a reserve polysaccharide in the leaf, stem, root (tuber), seed, fruit, and/or pollen of the plant. In its purified form, natural unmodified starch is a white tasteless and odorless powder.

In exemplary embodiments, semi-rigid gels comprising starch are formed by methods known in the art (see e.g., Glenn, G. M., et al., (1998) Industrial Crops and Products 8:123-132; and U.S. Pat. No. 5,595,595).

1. Unmodified Starch

Biochemically, starch comprises two polymeric carbohydrates known in the art as amylose and amylopectin. Amylose is an $\alpha(1,4)$-linked glucose polymer which is essentially a linear chain without branching. Amylopectin on the other hand, is a branched glucose polymer in which branch chains are linked to the main chain of $\alpha(1,4)$-linked polymer by $\alpha(1,6)$-linkages.

As is known in the art, starch, in its raw state, is typically found in the form of solid, dense granules. The granules typically occur in a size range that is between about 2 microns (e.g., in wheat starch), to over about 100 microns (e.g., in potato starch (see e.g., Cameron and Donald (1992) Polymer 33:2628-2635)).

Starch granules hydrate in aqueous solution, swelling as much as about 10% in volume. Additional swelling occurs when an aqueous suspension of granules is heated, until a temperature is reached where there is a transition from organization to disorganization. This is known as the gelatinization temperature and typically occurs over a range of about 10° C. As is known in the art, the exact gelatinization temperature is dependent on the particular starch.

In plants, native starch is synthesized by a series of enzymatic reactions (see e.g., Advances in Food and Nutrition Research, Vol. 41 supra; Martin and Smith (1995) Plant Cell. 7:971-985; Myers et al., (2000) Plant Physiol. 122: 989-997). Genes or cDNAs of most starch biosynthetic enzymes from corn, potato, barley, and wheat have been cloned, and the cloned genes have been used to over- or under-express starch biosynthetic enzymes (see e.g., Stark, D. M., et al., (1992) Science 258:287; and Flipse, E., et al., (1994) Theor. Appl. Genet. 88:369). Thus, in an exemplary embodiment, starch foam microparticles comprise starch from a transgenic plant that expresses one or more cloned starch biosynthetic genes.

The relative proportions of amylose and amylopectin differ in starches derived from different species and different cultivars within species. For example, amylose content of wheat starch is about 0% for waxy wheat cultivars and about 22-30% (about 29% on average) for normal (non-waxy) wheat cultivars, and high amylose wheat cultivars are also known (see e.g., U.S. Pat. No. 7,001,939).

In some maize cultivars the corn starch has an amylose content as high as about 70-80%. For example, commercially available high amylose corn starch (HACS) typically has between about 70% to about 80% amylose content. However, genetic variants with higher amylose levels are also known. In contrast, regular corn starch has about 25% amylose. HACS has different properties than the regular, low amylose corn starch. For example, HACS melts at a higher temperature than regular corn starch. Gels formed with HACS are strong, but are sometimes less elastic than are wheat and lower amylose corn starch. Gels made with HACS spread easily, especially if they comprise large percentages of water e.g., in a range that is between about 60% to about 95% water by weight. Gels comprising high percentages of alcohol e.g., about 60% to about 95% ethanol by weight, are typically harder and more brittle than gels with high percentages of water. Thus, different degrees of spreadability can be achieved by varying the water and/or alcohol content of a gel. The desired degree of spreadability will depend at least to some degree on the intended application and the preferences of the manufacturer and/or end user, and is readily determined by one of skill in the art having access to this disclosure.

The amylose and amylopectin content of starch can be measured by methods known in the art. In exemplary embodiments, amylose content is measured by the calorimetric methods (see e.g., Kuroda et al. Jpn. J. Breed. 39 (Suppl. 2):142-143, (1989)) and/or by amperometric titration (see e.g., Fukuba and Kainuma, "*Quantification of Amylose and Amylopectin*" in: Starch Science Handbook, Nakamura M. and Suzuki S., eds Tokyo: Asakura Shoten, pp 174-179, (1977)). Starch concentration of solutions are determined by any method known in the art e.g., by the phenol-sulfuric acid method (Dubois et al., (1956) Anal. Chem. 28:350-356) with glucose as a standard.

Starch structures also differ in different species and in different cultivars within species. For example, barley and wheat amylopectins have larger portions of short branch chains (6 to 14 glucose units), and proportionally fewer branch chains of 11 to 22 glucose units when compared to e.g., maize amylopectin (see e.g., Jane et al., (1999) Cereal Chem. 76(5): 629-637; and Song and Jane, (2000) Carbohydrate Polymers. 41:365-377).

In accordance with the differences in starch structure and composition, the size, shape, and gelatinization temperature of raw starch granules also vary based on the botanical source of the starch. For example, tapioca starch granules typically vary in diameter from between about 5 microns to about 35 microns, potato starch from between about 15 microns to about 100 microns, maize from between about 5 microns to about 25 microns, and rice starch granules vary from between about 3 microns to about 8 microns in diameter. Shapes typically include various, but are not limited to near perfect spheres, flattened ovoids, elongated disks, and polygons, and are characteristic of the source of the raw starch granule. Thus, a person of skill in the art can identify the plant source of a starch by observing the size and shape of the raw starch granule e.g., with the aid of a microscope.

As noted above, starch is found in nearly every type of plant tissue including, but not limited to the fruit, seeds, stems, leaves, rhizomes and/or tubers. Isolation of starch from plants is achieved by any of numerous methods well known in the art. Exemplary methodology is disclosed in e.g., Advances in Food and Nutrition Research, Vol. 41 supra; *Starch Chemistry and Technology*, R. L. Whistler ed., Academic Press (1984); and *Starch: Properties and Potential, Galliard*, T., ed, John Wiley and Sons (1987).

2. Modified Starch

Modified starch refers to starch that has been treated in order to modify one or more of its physical or chemical properties. Modification is brought about by any means known in the art e.g., including, but not limited to chemical modification, physical modification, modification by biotechnological methods, and traditional plant breeding methods (see e.g., *Starch in Food: Structure, Function and Applications*, Ann-Charlotte Eliasson, Ed. CRC Press, 2004).

Chemical modification typically alters the arrangement of glucose chains in the starch granules, and/or introduces additional chemical groups to the starch e.g., phosphate. Chemical modification can be achieved by any method known in the art (see e.g., Tomasik P, and Schilling C H. (2004) Adv. Carbohydr. Chem. Biochem. 59:175-403). Physical processes, e.g., heat, are also used to modify the characteristics of the starch. Starch is also frequently modified enzymatically, e.g., to promote reorganization of the glucose chains in the starch. Traditional plant breeding and modern biotechnology methods are also used to modify starch. For example in exemplary embodiments breeding methods are used to manipulate the type of starch made by different plants e.g., by modifying the enzymes responsible for making the "branches" in amylopectin to influence the structure of the amylopectin made by the plant.

Exemplary modified starches include, but are not limited to pregelatinized starches, acid modified starches, cationic starches, starch esters, cross-linked starches, hypochlorite-oxidized starches, hydroxyalkylastarches and starch phosphate monoesters.

B. Agar

As is known in the art, agar is a polysaccharide typically extracted from red marine algae e.g., from the genera *Gelidium* (Gelidiaceae), *Gracilaria* (Gracilariaceae), *Pterocladia* (Gelidiaceae), and *Ahnfeltia* (Phyllophoraceae). Agar typically comprises a heterogeneous mixture of two polysaccharides, agarose and agaropectin, which are galctose based polymers. The agar polysaccharides agarose and agaropectin, share a common galactose-based backbone structure however, agaropectin is heavily modified with acidic side-groups, e.g., with sulfate and pyruvate. As is known in the art, the chemical composition of agar varies according to the seaweed source, the environment where the seaweeds grow and on the method of preparation of the agar. See e.g., Meer, W. (1980) In: *Handbook of Water-soluble Gums and Resins*, pp. 7-1 to 7-19, Davidson, R., ed. McGraw-Hill, New York.

Hot solutions of agar form gels upon cooling to temperatures that are in a range between about 30° C. to about 60° C. Conversely, agar melts to sols upon heating to temperatures in a range that is between about 90° C. to about 100° C. As is known in the art, the exact gelling temperatures of a given agar is dependent on the source of the agar. Typically the gelling temperature correlates with the methoxy content of the agarose. In general, the higher methoxy content, the higher the gelling temperature (see e.g., Guiseley, K. B. (1970) Carbohyd. Res. 13:247-256). The melting and gelling temperature of a given agar is readily determined by one of skill in the art through routine trial and error. Gel strength of agar is typically influenced by the content of agarose, a higher gelling component of agar, which typically comprises about 30% or less of the polysaccharide mixture.

In exemplary embodiments, semi-rigid gels comprising agar are formed by methods known in the art (see e.g., Glenn, G. M., et al., (1998) supra; and U.S. Pat. No. 5,595,595).

C. Alginate

Alginate is a polysaccharide extract from brown seaweeds (Phaeophyceae). As is known in the art, alginates are linear copolymers comprising covalently linked homopolymeric blocks of $\beta(1\rightarrow4)$-linked D-mannuronic acid (M) and $\alpha$-$(1\rightarrow4)$-linked L-guluronic acid (G) residues. The relative amount of each block type varies with the origin of the alginate.

As is known in the art, alternating blocks form the most flexible chains and are more soluble at lower pH than the other blocks. G-blocks form stiff chain elements, and form stable cross-linked junctions with divalent cations (e.g. $Ca^{2+}$, $Ba^{2+}$, $Sr^{2+}$) leading to a three-dimensional gel network. At low pH, protonized alginates form acidic gels. The water-soluble salts of alginic acid include those of alkali metal ($Na^+$, $K^+$, etc.), ammonia and low molecular weight amines and quaternary ammonium compounds.

In an exemplary embodiment, semi-rigid gels comprising alginate are formed by methods known in the art (see e.g., Glenn, G. M., et al., (1998) supra).

D. Proteins

In an exemplary embodiments, proteins provide the structural basis if the semi-rigid gel matrix. Typically, a "protein gel" is formed by dispersion of isolated protein products in an appropriate dispersing medium, such as e.g., water or other aqueous solution, and mixing at temperatures that are at or above the gelling temperature, then cooling to form the protein gel. The actually gelling temperature depends on the type of proteins dispersed and on the dispersing agent employed and is readily determined by one of skill in the art.

Exemplary proteins include, but are not limited to gelatin, albumin etc, however, any protein with useful gelling properties can be used. In one exemplary embodiment, the gelling agent is gelatin. In an exemplary embodiment, semi-rigid gels comprising gelatin are formed by methods known in the art (See e.g., S. S. Kistler (1932), supra). After forming the aquagel the semi-rigid gel article comprising gelatin is subjected to solvent exchange in order to introduce into the semi-rigid gel article a suitable cleaning agent e.g., a surfactant, an antimicrobial etc.

III. Solvents

A. Water Miscible Solvents

In an exemplary embodiment, a semi-rigid gel article comprises a water miscible solvent. As is well known in the art, the polarity of a solvent determines what type of compounds it dissolves and with what other solvents or liquid compounds it is miscible. Since water is a highly polar substance, water miscible solvents tend to be themselves polar substances e.g., ethanol, isopropanol, dimethylsulfoxide (DMSO), acetone, propylene glycol, etc.

In one exemplary embodiment, the water miscible solvent is water. In another exemplary embodiment, the water miscible solvent is an alcohol e.g. ethanol. In another exemplary embodiment, the water miscible solvent is a ketone e.g., acetone. In another exemplary embodiment, the water miscible solvent is an aldehyde e.g., acetaldehyde.

In some exemplary embodiments the water miscible solvent is a single solvent e.g., a single species of alcohol. In other exemplary embodiments the water miscible solvent is a mixture of water miscible solvents e.g., a mixture of more than one species of alcohol, a mixture of alcohol and water, an aqueous solution comprising a surfactant, an aqueous solution comprising an antimicrobial, a mixture of more than one species of ketone, a mixture of more than one species of aldehyde, and/or a mixture of one or more species of alcohol and one or more species ketone, etc. In other exemplary embodiments, the water miscible solvent is a mixture of water miscible liquids and water immiscible liquids e.g., ethanol and an oil e.g., lemon oil. In still other exemplary embodiments, water miscible liquids are a solution comprising a water miscible solvent and a dissolved substance e.g., an antimicrobial, a surfactant, etc. In still other exemplary embodiments, water miscible liquids are a solution comprising a water miscible solvent and particles that are not dissolved e.g., particulate abrasives, beadlets encapsulating active substances such as e.g., fragrances, antimicrobials, pharmaceuticals, emollients, etc.

In one exemplary embodiment, the semi-rigid gel article comprises at least one alcohol. In another exemplary embodiment, the alcohol is a water miscible alcohol. Exemplary water miscible alcohols include, but are not limited to "lower" alcohols which typically comprise six or fewer carbon atoms. In some exemplary embodiments, water miscible alcohols include lower alcohols comprising four or fewer carbon atoms. Thus, in an exemplary embodiment, the semi-rigid gel article comprises at least one alcohol selected from the group consisting of a one carbon e.g., methanol, a two carbon e.g., ethanol, a three carbon e.g., propanol, and a four carbon alcohol e.g., butanol, or a combination of such members.

In one exemplary embodiment, the alcohols are approved for use on human skin, e.g., ethanol, isopropanol, or a combination thereof. In another exemplary embodiment, one or more alcohols provide antimicrobial functionality. Thus, in another exemplary embodiment, the semi-rigid gel comprises an effective amount of alcohol to produce a reduction in microorganisms on the surface of the skin. In another exemplary embodiment, one or more alcohols facilitate the drying process.

In one exemplary embodiment, one or more water miscible solvent(s) are present in the formulation at a concentration from about 60% by weight to about 98% by weight. In other exemplary embodiments, one or more water miscible solvent(s) are present the semi-rigid gel article at a concentration of about 98% by weight, 97% by weight, 96% by weight, 95% by weight, 94% by weight, 93% by weight, 92% by weight, 91% by weight, 90% by weight, about 85% by weight, about 80% by weight, about 75% by weight, about 70% by weight, about 65% by weight, or about 60% by weight.

B. Water Immiscible Solvents

In an exemplary embodiment, a semi-rigid gel article comprises a water immiscible solvent. In some exemplary embodiments the water immiscible solvent is a single solvent e.g., a single species of aliphatic alcohol, or a single species of oil. In other exemplary embodiments the water immiscible solvent is a mixture of water immiscible solvents e.g., a mixture of more than one species of aliphatic alcohol, a mixture of an aliphatic alcohol and a skin emollient. In other exemplary embodiments, the water immiscible solvent is a mixture of water miscible liquids and water immiscible liquids e.g., ethanol and an oil e.g., lemon oil. In still other exemplary embodiments, water miscible liquids are a solution comprising a water immiscible solvent and a dissolved substance e.g., an antimicrobial, a surfactant, etc. In still other exemplary embodiments, water immiscible liquids are a solution comprising a water immiscible solvent and particles that are not dissolved e.g., particulate abrasives, beadlets encapsulating active substances such as e.g., fragrances, antimicrobials, pharmaceuticals etc.

A wide range of water-immiscible solvents are suitable for use in a semi-rigid gel article. Exemplary the water-immiscible solvents include, but are not limited to a vegetable oil, e.g., soy bean oil, safflower oil, cottonseed oil, corn oil, sunflower oil, lemon oil, essential oils, etc. Other water immiscible liquids include esters of medium or long-chain fatty acid e.g., a mono-, di-, or triglyceride; or is a chemically modified or manufactured material such as ethyl oleate, isopropyl myristate, isopropyl palmitate, a glycerol ester or polyoxyl hydrogenated castor oil, marine oils e.g., cod liver or another fish-derived oil. Suitable solvents also include fractionated oils e.g., fractionated coconut oil or modified soy bean oil. In an exemplary embodiment a water immiscible liquid or water immiscible solvent comprises a mixture of two or more water-immiscible solvents.

In some exemplary embodiments, it is not necessary that the water immiscible solvent be completely immiscible with water. Indeed, in some exemplary embodiments, the solubility of a water immiscible solvent is such that it forms a separate phase with water when mixed with water in certain proportions.

IV. Other Additives

In some exemplary embodiments, semi-rigid gels further comprise other additives which may be active agents e.g., an additive to maintain the skin pH, silicone, and emollients or oils for skin moisturizing; fillers such as hulls, calcium carbonate, and/or cleansing abraders known in the art, stain removers and/or preservatives etc, or inert ingredients. Any additive known in the art is useful in the practice of the invention. Indeed, the choice of additives is simply the preference of the manufacturer/user.

In an exemplary embodiment, a humectant is added to assist in the retention of liquids within the product. In another exemplary embodiment, a thickening agent is added to modify the product viscosity. In one exemplary embodiment, the humectant is present in an amount that is in a range that is between about 0 wt % to about 5 wt %. In another exemplary embodiment, the thickener is present in an amount that is in a range that is between about 0.1 wt % to about 6.5 wt %. In exemplary embodiments, the thickener is a cellulose-based material e.g., methyl cellulose added at concentrations of about 0.1 wt % to about 1.5 wt % used in combination with fumed silica added at concentrations of about 0.1 wt % to about 5.0 wt %.

In another exemplary embodiment, the semi-rigid gel comprises additional antimicrobial agents to enhance the germicidal effects of the alcohol. Exemplary agents include, but are not limited to para-chloro-meta-xylenol (PCMX), chlorhexidene gluconate (CHG), triclosan, quaternary ammonium salts e.g., benzalkonium chloride, benzethonium chloride and cetrimide, and other agents as are generally known in the art. In exemplary embodiments, additional antimicrobial agents are present in the semi-rigid gel composition in an amount that is in a range of between about 0.25% by weight and about 10% by weight or at a concentration known to be effective as an antimicrobial.

In still other exemplary embodiments, the semi-rigid gel comprises emollients. Some exemplary emollients include, but are not limited to short chain alkyl or aryl esters (C1-C6) of long chain straight or branched chain alkyl or alkenyl alcohols or acids (C8-C32) and their polyethoxylated derivatives; short chain alkyl or aryl esters (C1-C6) of C4-C 12 diacids or diols optionally substituted in available positions by —OH; alkyl or aryl C1-C10 esters of glycerol, pentaerythritol, ethylene glycol, propylene glycol, as well as polyethoxylated derivatives of these and polyethylene glycol; C12-C22 alkyl esters or ethers of polypropylene glycol; C12-C22 alkyl esters or ethers of polypropylene glycol/polyethylene glycol copolymer; and polyether polysiloxane copolymers. Additional examples of occlusive emollients include cyclic and linear dimethicones, polydialkylsiloxanes, polyaryl/alkylsiloxanes, long chain (C8-C36) alkyl and alkenyl esters of long straight or branched chain alkyl or alkenyl alcohols or acids; long chain (C8-C36) alkyl and alkenyl amides of long straight or branched chain (C8-C36) alkyl or alkenyl amines or acids; hydrocarbons including straight and branched chain alkanes and alkenes such as squalene, squalane and mineral oil; jojoba oil, polysiloxane, polyalkylene copolymers, dialkoxy dimethyl polysiloxanes, short chain alkyl or aryl esters (C1-C6) of C12-C22 diacids or diols optionally substituted in available positions by OH such as diisopropyl dimer dilinoleate; and C12-C22 alkyl and alkenyl alcohols, long chain alkyl or aryl esters (C8-C36) of C12-C22 diacides or diols optionally substituted in available positions by —OH, such as diisostearyl dimer dilinoleate; lanolin and lanolin derivatives, and beeswax and its derivatives. Additional examples of emollients include Lauric Acid, Palmitic Acid, Myristic Acid, PEG-3 Glyceryl Cocoate, Propylene Glycol Diperlargonate, Octyl Stearate, Ceteth-10, Glycereth-26, Isocetyl Stearate, Octyldodecyl Stearoyl Stearate, Isopropyl Isostearate, Isostearyl Isostearate, Isostearyl Palmitate, Myristyl Stearate, Myristyl Lactate, Myristyl Myristate, Octyl Palmitate, PEG-7 Glyceryl Cocoate, Cetyl Esters, Isostearyl Neopentanoate.

The level of emollient is selected to provide the desired level of activity and can be modified as desired. In one embodiment, the emollient is glycerol, propylene glycol, dipropylene glycol, polypropylene glycol, polyethylene glycol, sorbitol, pantothenol, gluconic acid salts, shea butter, cocoa butter, dimethicone/cyclomethicone (silioxanes) or commercially available materials, such as POLAWAX® from Croda. In another embodiment, the emollient is glycerol.

In other embodiments, the semi-rigid gel article comprises aesthetic additives, e.g., fragrance and/or colorants. Fragrances are well known in the art. Some exemplary fragrances are disclosed in e.g., U.S. Pat. No. 7,169,746, In exemplary embodiments, emollients, moisturizing agents, fragrance and/or colorants are added as necessary e.g., at concentrations for consumer acceptance. In exemplary embodiments, the formulation comprises from about 0.1 wt % to about 1.5 wt % fragrance, dye or a combination thereof. In other exemplary embodiments, the formulation further comprises from about 0.1 wt % to about 5 wt % of additional emollients e.g., tea tree oil, hemp oil, aloe-based oil, lanolin, jojoba, chamomile, floral oils, herbal materials or a combination thereof.

In still other exemplary embodiments, the semi-rigid gel comprises at least one surfactant. Numerous surfactants are known in the art. Some exemplary surfactants include, but are not limited to cationic surfactants e.g., cetyltrimethylammonium chloride, stearyltrimethylammonium chloride, behenyl trimethylarnmonium chloride, behenyl dimethyl hydroxyethyl ammonium chloride, stearyldimethylbenzylammonium chloride, and cetyltriethylammonium methylsulfate; anionic surfactants e.g., Sodium Lauryl Sulfate, Sodium Laureth Sulfate, Sodium Laureth, Sodium Laureth Sulfate, Ammonium Laureth Sulfate Ammonium Lauryl Sulfate, TEA-Lauryl Sulfate, TEA-Laureth Sulfate N-acylmethyl taurate, N-acyl taurate, N-acyl isethionate; nonionic surfactants e.g., such as those disclosed in U.S. Pat. No. 3,929,678, Cocoamide DEA, Cocoamide MEA, Ethylene Glycol Monostearate Ethylene Glycol Distearate; and amphoteric surfactants e.g., Cocoamidopropyl Betaine, Laurylamidopropyl Betaine, Lauryl Dimethyl Amine Oxide, Cocoamidopropyl Dimethyl Amine Oxide.

In still other exemplary embodiments, the semi-rigid gel comprises at least one stain remover. Exemplary stain removers include, but are not limited to stain removers disclosed in e.g., U.S. Pat. Nos. 5,891,197, 5,872,090, 5,849,039, 5,789,368 and 5,681,355

In still other exemplary embodiments, the semi-rigid gel comprises at least one antimicrobial. Exemplary antimicrobials include, but are not limited to biguanides, natural, acid, chitosan, triclosan, quats and/or metal. In some exemplary embodiments, the antimicrobial agent is PHMB, PHMB and silver iodide, natural oil, chitosan, lactic acid, glycolic acid, or silver citrate and/or antimicrobials disclosed in U.S. Pat. No. 6,613,755, and U.S. Pat. No. 6,846,847.

In still other exemplary embodiments, the semi-rigid gel comprises at least one plasticizer. A plasticizer is added to affect the elasticity and tensile strength of the semi-rigid gel article. Exemplary plasticizers include, but are not limited to polyhydric alcohols (i.e., polyols), amino alcohols, hydroxyalky amides and mixtures thereof. Other suitable plasticizers include glycerol, diethylene glycol, sorbitol, sorbitol esters, maltitol, malitol, mannitol, sucrose, fructose, invert sugars, corn syrup, and mixtures thereof.

In still other exemplary embodiments, the semi-rigid gel comprises at least one pharrnaceutical, breath freshener, and/or flavor.

V. Production of Semi-Rigid Gels

Semi-rigid gels are prepared from any suitable gelling material e.g., starch, agar, alginate etc. Typically, semi-rigid gels are prepared by first forming a melt. In gyeneral, a melt is formed by first heating a solution of gelling agent e.g., starch, agar, alginate etc., to a temperature that is at or above the gelatinization temperature of the gelling agent, for a time sufficient to achieve gelatinization. In an exemplary embodiment, gelatinization is observed as the loss of birefringence, as is known in the art. See e.g., U.S. Pat. No. 5,595,595. In another exemplary embodiment, gelatinization is observed by measuring the viscosity of the heated gelling agent-water mixture. Typically, as is known in the art (see e.g., U.S. Pat. No. 5,595,595), viscosity increases to a maximum and then decreases, thus indicating gelatinization has occurred.

Once formed, the melt is treated to exchange the water in the melt with a specified water miscible solvent e.g. isopropanol. Semi-rigid gels can be produced by any method known in the art. In an exemplary embodiment, the semi-rigid gel is made from a starch melt. Starch melts are known in the art (see e.g., Whistler, et al., "Starch: Chemistry and Technology", Second Edition, Academic Press, 1984; and Van Beynum, G. M. A., et al., "Starch Conversion Technology", Marcel Dekker, Inc., 1985; Glenn G. M., et al. (1998) supra; and co-pending U.S. Patent Application Publication No. 2008/0131538). In another exemplary embodiment, the semi-rigid gel is made from an agar melt. In still another exemplary embodiment, the semi-rigid gel is made from an alginate melt. Agar melts and alginate melts are known in the art (see e.g., Kistler S. S. (1932) supra; and Glenn G. M. et al. (1998) supra).

In an exemplary embodiment, semi-rigid gels are prepared using starch. In one exemplary embodiment, an aqueous starch slurry is heated to above the gelatinization temperature and is then cooled to form a gel. After cooling, the water in the cooled gel is displaced with a water miscible solvent e.g., ethanol, through one or more equilibration steps. In some exemplary embodiments, semi-rigid gel articles are prepared from aqueous slurries of wheat, dent corn and/or high amylose corn starches or combinations thereof.

In one exemplary embodiment, starch gels are made by gelatinizing aqueous starch slurries (10% w/w) by heating beyond the gelatinization temperatures of the respective starches. The starch melts are poured into molds and stored refrigerated overnight to allow gelation to occur. The resulting semi-rigid starch gel is then subjected to a solvent exchange procedure to achieve the desired semi-rigid gel composition.

Typically, the concentration range for a gelling agent varies according to the type of gelling materials used and in accordance with function of the desired end product. The exact amount for any given application is readily determined by one of skill in the art e.g., by way of trial runs, having the benefit of this disclosure.

In one exemplary embodiment, the concentration of starch to water for forming a melt is in a range of concentration that is between about 1% to about 20% starch, weight by volume. In other exemplary embodiments the concentration of starch to water for forming a melt is about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% starch weight by volume. In other exemplary embodiments, the starch concentration is higher, e.g., up to about 50% weight by volume, when the starch-water mixture is heated in an extruder, by methods known in the art see e.g., U.S. Pat. No. 5,595,595.

In one exemplary embodiment, the starch is unmodified wheat starch, and the concentration of starch to initial water in the melt is between about 6% to about 10% weight by volume. In another exemplary embodiment, the concentration of unmodified wheat starch is about 8%. In still other embodiments the concentration of unmodified wheat starch is about 6% or 9% starch, weight to volume. In another exemplary embodiment, the starch is unmodified high amylose starch e.g., high amylose corn starch, high amylose wheat starch etc. In one exemplary embodiment, the concentration of unmodified high amylose starch to initial water for preparation of a melt is in a range that is between about 5% to about 8%. In another exemplary embodiment, the concentration of unmodified high amylose starch is about 6%, or about 7% starch, weight to volume. In another exemplary embodiment, the concentration of starch in the suspension is in a range that is between about 2% to about 5% by weight.

To prepare a melt a mixture of starch and water is prepared with a selected starch concentration. The mixture is heated to over about 90° C. In other embodiments, mixture is heated to over about 91° C., about 92° C., about 93° C., about 94° C., about 95° C. about 96° C., about 97° C., about 98° C., or about 99° C., In some embodiments, semi-rigid gels are formed by heating the starch melt to over about 100° C. e.g., 101° C., 102° C., 103° C., 104° C., 105° C., 106° C., 107° C., 108° C., 109° C., or more. In other exemplary embodiments, higher temperatures e.g., at least about 110° C., 111° C., 112° C., 113° C., 114° C., 115° C., 116° C., 117° C., 118° C., 119° C., or 120° C. more, up to about 150° C., may be used to form the melt. Any suitable temperature can be used, however starch will begin to degrade at temperatures above 200° C. Therefore, to achieve the melt one of skill in the art would appreciate that in preparing the melt, the temperature should be adjusted so as to be high enough to prepare the melt, but low enough to prevent degradation of the starch e.g., between about 90° C. to about 120° C.

In an exemplary embodiment, the starch melt is formed as disclosed above, and the resulting melt is poured into a container/mold/form and allowed to cool and gel. The container/mold/form can be of any shape e.g., a capsule, a rectangle, square, circle, oval. star, heart, animal etc. . . . Although the mold/form/container can be of any thickness, typically the mold/form/container has a thickness that is in a range that is between about 1 millimeter (mm) and about 2 inches or more. Indeed, in some exemplary embodiments the semi-rigid gel article is a sheet wherein the thickness of the sheet is significantly less than either the length or the width of the sides. In other exemplary embodiments, the semi-rigid gel article is a capsule the length of which, in some exemplary embodiments, is in a range that is between about 1.0 centimeter (cm) to about 6.0 cm. In other exemplary embodiments, the semi-rigid gel article is a core or cube that is at least about 1 inch in thickness, at least about 2 inches, at least about 3 inches, at least about 4 inches, at least about 5 inches in thickness.

In general, one of skill in the art, having reference to this disclosure will be able to determine a suitable shape and thickness for the particular application. For example, in one exemplary embodiment, the semi-rigid gel article is a hand cleaner/sanitizer, the semi-rigid gel article is a sheet form and the thickness of the sheet is in a range that is between about 1 mm and 1 cm thickness. In another exemplary embodiment, the semi-rigid gel article is a hand cleaner/sanitizer, the semi-rigid gel article is a capsule form, the diameter of the capsule is in a range that is between about 2 mm and about 1 cm, and the length of the capsule is in a range that is between about 1 cm and about 6 cm. In still another exemplary embodiment the semi-rigid gel article is a stain remover having a core form wherein the diameter of the core has a size that is a range of between about 2 cm and a thickness that is in a range that is between about 1 inch and about 4 inches.

Once cooled and formed into a desired shape, the gel is placed in a container of water miscible solvent as noted above and allowed to equilibrate. In one exemplary embodiment, the water miscible solvent is an alcohol e.g., ethanol. In another exemplary embodiment, the water miscible solvent is a ketone e.g., acetone. In another exemplary embodiment, the water miscible solvent is an aqueous solution comprising a surfactant. In another exemplary embodiment, the water miscible solvent is an aqueous solution comprising an antimicrobial. In an exemplary embodiment, the solvent is changed at least once. In another exemplary embodiment, the solvent is changed several times. The number of solvent changes appropriate for any particular product is readily determined by one of skill in the art.

In one exemplary embodiment, the gel is first equilibrated with a water miscible solvent, and subsequently is further treated by equilibrating in a second solvent that is miscible with the water miscible solvent, but not necessarily with water. In such an exemplary embodiment, it is not necessary that the second solvent be completely immiscible with water. Indeed, in some exemplary embodiments, the miscibility of the second solvent in water is substantially less than that of the first solvent. The term "substantially less" in this context means that in the relative amounts used, the first solvent will not form a separate phase with water while the second solvent will.

Thus, in an exemplary embodiment, the product is a low-solids gel that comprises a liquid component and a solid component, wherein the liquid component is present at a weight that is at least about several times the weight of the solid component. In an exemplary embodiment, the liquid component is present at a weight that is about equal to the weight of the solid component. In another exemplary embodiment, the liquid component is present at a weight that is at least about 1.5 times the weight of the solid component. In another exemplary embodiment, the liquid component is present at a weight that is at least about 2 times the weight of the solid component. In another exemplary embodiment, the liquid component is present at a weight that is at least about 2.5 times the weight of the solid component. In another exemplary embodiment, the liquid component is present at a weight that is at least about 3 times, at least about 4 times, at least about 5 times, at least about 6 times, at least about 7 times, at least about 8 times, at least about 9 times, at least about 10 times, the weight of the solid component.

In another exemplary embodiment, a semi-rigid gel article comprises agar. In one exemplary embodiment, agar powder is mixed with water to form a slurry and heated to cause the agar to dissolve and form a moderately viscous solution and is then cooled to form a gel in the desired shape as discussed above. After cooling, the water in the semi-rigid gel is displaced with a water miscible solvent e.g., ethanol, through one or more equilibration steps. Typically, the concentration of agar to initial water is in a range that is between about 0.25% to about 5%. In some exemplary embodiments the concentration of agar to initial water is in a range that is between about 1% to 3% agar. In other exemplary embodiments the concentration of agar to initial water is about 4% agar. In other exemplary embodiments the concentration of agar to initial water is about 2% agar.

In another exemplary embodiment, semi-rigid gel article comprises alginate. In one exemplary embodiment, alginate powder is mixed with water to form a slurry and is heated to dissolve the alginate. The heated alginate mixture is then mixed into a calcium ion-containing solution to form a semi-rigid gel. After cooling, the gel is stored in CaCl2 solution as is known in the art (see e.g., Glenn G. M., et al. (1998) supra). The aqueous solution in the cooled gel is displaced with a solvent through one or more equilibration steps as described above. Typically, the concentration of alginate to initial water is in a range that is about 0.25% to about 3%. In some exemplary embodiments the concentration of agar to initial water is about 1% alginate.

In some exemplary embodiments, the semi-rigid gel further comprises other additives e.g., fillers, abraders, fragrances etc. Other additives can be components of the solvent phase, and/or can be incorporated into the solid phase. Thus, the matrix itself can comprise other additives.

B. Solidity of Semi-Rigid Gel Articles

The solidity and/or rigidity of a semi-rigid gel article is readily determined by any method known in the art. For example, in one exemplary embodiment, the solidity of a semi-rigid gel article is appreciated by picking up a semi-rigid gel and observing that the gel does not break or smear.

In other exemplary embodiments, the rigidity of a semi-rigid gel article can be precisely measured by methods known in the art (see e.g., Meyer, M. A. and Chawla, K. K. *Mechanical Behavior of Materials* Prentice-Hall, (1999), 680 pp). For example in some exemplary embodiments the solidity of a semi rigid gel is expressed as the linear viscoelastic response measured in an oscillatory test using a Dynamic Mechanical Analyzer (see e.g., Barnes, Howard A., *A Handbook of Elementary Rheology*, Institute of Non-Newtonian Fluid Mechanics, University of Wales, 2000). In an exemplary embodiment, a semi-rigid gel article has a storage modulus of at least about 2 kPa and a loss modulus of at least about 0.3 kPa at about 15° C.-25°.

In other exemplary embodiments, the solidity of a semi-rigid gel is measured by determination compressive strength, compressive modulus and/or dynamic modulus. In an exemplary embodiment, a semi-rigid gel article is cut with an implement e.g., a cork borer, to form sample cylinders. In an exemplary embodiment, the cylinders are then deformed to about 25% of the gel thickness by compression using e.g., an Instron Universal Testing Machine (model 4502, Instron Corp. Norwood, Mass.) equipped with 100 N load cell. The cross-head speed is set at 5 mm/min. The Load (kN), Stress (kPa) and Modulus (MPa) can then be calculated by methods known in the art.

In an exemplary embodiment, a semi-rigid gel article has a compressive strength of at least about 2.0 kPa. In another exemplary embodiment, a semi-rigid gel article has a compressive strength that is in a range that is between about 2 kPa and about 250 kPa.

Typically, the compressive strength varies in accordance with the nature of the gelling agent and also with the nature and concentration of the solvent that fills the pores of the matrix. For example, as seen in FIG. 1, in an exemplary embodiment, a semi-rigid gel article comprising Dent corn starch and water has a compressive strength of about 2.4 kPa. In contrast, in another exemplary embodiment, a semi-rigid gel article comprising wheat starch and water has a compressive strength of about 3.0 kPa.

In another exemplary embodiment, a semi-rigid gel article comprising Dent corn starch and 30% ethanol has a compressive strength of about 16.0 kPa. In contrast, in another exemplary embodiment, a semi-rigid gel article comprising wheat starch and 30% ethanol has a compressive strength of about 9.3 kPa.

In another exemplary embodiment, a semi-rigid gel article comprising Dent corn starch and 60% ethanol has a compressive strength of about 66.0 kPa. In contrast, in another exemplary embodiment, a semi-rigid gel article comprising wheat starch and 60% ethanol has a compressive strength of about 30.7 kPa.

In still another exemplary embodiment, a semi-rigid gel article comprising Dent corn starch and 90% ethanol has a compressive strength of about 101.0 kPa. In contrast, in another exemplary embodiment, a semi-rigid gel article comprising wheat starch and 90% ethanol has a compressive strength of about 83.8 kPa.

In another exemplary embodiment, a semi-rigid gel article has a compressive modulus of at least about 9.0 kPa. In another exemplary embodiment, a semi-rigid gel article has a compressive modulus that is in a range that is between about 9 kPa and about 225 kPa. Compressive modulus also varies with the nature of the gelling agent and the nature of the solvent. For example FIG. 2 shows some exemplary embodiments.

In another exemplary embodiment, a semi-rigid gel article has a dynamic modulus of at least about 0.85 kPa. In another exemplary embodiment, a semi-rigid gel article has a dynamic modulus that is in a range that is between about 0.8 kPa and about 60 kPa. Dynamic modulus can vary with the nature of the gelling agent and the nature of the solvent. For example in an exemplary embodiment, FIG. 3 illustrates a semi-rigid gel article comprising dent corn starch and water that has a dynamic modulus of about 0.85 kPa. In another exemplary embodiment, FIG. 3 illustrates a semi-rigid gel article comprising wheat starch and water that has a dynamic modulus of about 2.4 kPa.

In another exemplary embodiment, FIG. 3 illustrates a semi-rigid gel article comprising dent corn starch and 30% ethanol that has a dynamic modulus of about 19.6 kPa. In another exemplary embodiment, FIG. 3 illustrates a semi-rigid gel article comprising wheat starch and 30% ethanol that has a dynamic modulus of about 17.7 kPa.

Thus, the Rigidity/solidity of a semi-rigid gel article can be varied to achieve a semi-rigid gel article of a rigidity/solidity for any desired application. In general, semi-rigid gel articles used as hand sanitizers or hand cleaners will typically have a compressive strength, compressive modulus, and/or dynamic modulus that is at the lower end of the scale, whereas a semi-rigid gel article designed for use in cleaning of hard surfaces and/or stain removing, will typically have a compressive strength, compressive modulus, and/or dynamic modulus that is at the higher end of the scale. Semi-rigid gel articles used as fabric or clothing cleaners/stain removers or stain inhibitors will typically have a compressive strength, compressive modulus, and/or dynamic modulus that is throughout the scale of low to high, since the rigidity will depend on the preference of the manufacturer/user.

Thus, in an exemplary embodiment, a semi-rigid gel article for use as a hand cleaner has a dynamic modulus that is in a range that is between about 0.8 kPa to about 35 kPa. In some exemplary embodiments, a semi-rigid gel article for use as a hand cleaner has a dynamic modulus that is about 0.8 kPa, about l kPa, about 1.5 kPa, about 2 kPa, about 3 kPa, about 4 kPa, about 5 kPa, about 6 kPa, about 7 kPa, about 8 kPa, about 9 kPa, about 10 kPa, about 11 kPa, about 12 kPa, about 13 kPa, about 14 kPa, about 15 kPa, about 17 kPa, about 18 kPa, about 9 kPa, about 20 kPa, about 21 kPa, about 22 kPa, about 23 kPa, about 24 kPa, about 25 kPa, about 26 kPa, about 27 kPa, about 28 kPa, about 29 kPa, about 30 kPa, about 31 kPa, about 32 kPa, about 33 kPa, about 34 kPa, or about 35 kPa.

In another exemplary embodiment, a semi-rigid gel article for use as a cleaning stick and/or stain removing stick has a dynamic modulus that is in a range that is between about 35 kPa about 60 kPa. In some exemplary embodiments, a semi-rigid gel article for use as a stain removing stick has a dynamic modulus that is about 35 kPa, about 36 kPa, about 37 kPa, about 38 kPa, about 39 kPa, about 40 kPa, about 41 kPa, about 42 kPa, about 43 kPa, about 44 kPa, about 45 kPa, about 46 kPa, about 47 kPa, about 48 kPa, about 49 kPa, about 50 kPa, about 51 kPa, about 52 kPa, about 53 kPa, about 54 kPa, about 55 kPa, about 56 kPa, about 57 kPa, about 58 kPa, about 59 kPa, or about 60 kPa.

C. Using Semi-Rigid Gel Articles

In an exemplary embodiment, the semi-rigid gel article is a hand/skin cleanser. In an exemplary embodiment, hand hygiene controls infection in a health care environment. Therefore, in one exemplary embodiment semi-rigid gel hand/skin cleansers are used for cleansing hands in a health care environment. Typically, a hand/skin cleaning semi-rigid gel article is comprised mostly of a cleaning agent, in the form of a solution comprising a cleaning agent or, in some embodiments a solution of ethanol or isopropanol. In some embodiments the semi-rigid gel hand cleaner comprises fragrances. In some embodiments the semi-rigid gel hand cleaner comprises abrasion materials. Typically the semi-rigid gel article hand cleaner is molded in to a convenient form e.g., capsules or sheets of desirable dimensions. The semi-rigid gel comprises enough cleaning agent to clean the hands of an average adult.

The wiping action of the hands provides sufficient compression to release the cleansing agent from the semi-rigid gel article to clean the hands. Continued wiping and compression reduces the gel solids to a very small residue that can simply be wiped off the hands and discarded on site. The residue is so small that it is inconspicuous if deposited either indoors or out-of-doors. The dirt and debris removed from the skin are typically absorbed into the residue. Thus, the residue contains much of the dirt and debris removed from the hands by the cleansing agent. Therefore dirt, germs, etc are removed from the hands along with the gel residue.

Thus, once the semi-rigid gel article releases the cleaning agent, there is very little residue left to discard. Indeed, in some embodiments, the residue is so small that the semi-rigid gel article apparently dissolves, or disappears as compression and wiping action are applied.

In another exemplary embodiment, the semi-rigid gel article is used as a wound cleaner. A wound cleaner typically comprises an antimicrobial cleaning agent. In some exemplary embodiments a wound cleaner further comprises a pharmaceutical that facilitates cleaning and/or wound healing.

In another exemplary embodiment, the semi-rigid gel article is a hard surface cleaner. Exemplary hard surfaces include, but are not limited to floors, walls, countertops, household appliances e.g., washer/dryer, dishwasher, toaster etc, sinks, ceilings, and etc. In some embodiments the hard surface cleaner comprises a detergent. In other embodiments the hard surface cleaner comprises a stain remover. Typically, a hard surface cleaning semi-rigid gel article comprises a cleaning agent, typically in the form of a solution comprising a cleaning agent and, in some embodiments the solution comprises a solution of ethanol or isopropanol. In some embodiments the semi-rigid gel hard surface comprises fragrances. In some embodiments the semi-rigid gel hard surface comprises abrasion materials. In some embodiments the semi-rigid gel hard surface comprises stain remover(s). Typically the semi-rigid gel article hard surface is molded in to a convenient form e.g., stick or block desirable dimensions. The semi-rigid gel comprises enough cleaning agent to clean at least one reasonably sized hard surface area, and may be used for repeated applications.

As disclosed above for hand/skin cleaners the wiping action of the semi-rigid gel article against the surface to be cleaned provides sufficient compression to release the cleansing agent from the semi-rigid gel article to clean the surface. Continued wiping and compression reduces the gel solids to a very small residue that can simply be wiped off the surface and discarded on site. The residue is so small that it is inconspicuous if deposited either indoors or out-of-doors. In some embodiments, the residue is so small that the hard surface cleaner apparently dissolves as it is being used.

In still other exemplary embodiments, the semi-rigid gel cleansing article is used to clean fabric or clothing.

In some exemplary embodiments, the semi-rigid gel cleansing article is used in conjunction with water e.g., a surface is wetted either before use of a semi-rigid gel article, or after use of a semi-rigid gel article e.g., the surface is rinsed after use of a semi-rigid gel cleansing article.

In still other exemplary embodiments, the semi-rigid gel article is used for lubricating a surface. Lubricants are chemical, compounds or mixtures thereof that are capable of reducing the coefficient of friction between two surfaces in sliding or rolling-sliding contact. Lubricating agents are known in the art (see e.g., U.S. Pat. No. 6,734,147 and U.S. Pat. No. 7,160,378). Some exemplary lubricants include but are not limited to molybdenum disulfide, graphite, aluminum stearate, zinc stearate, carbon compounds e.g., coal dust and carbon fibers, ester lubricants, polyglycols, silicones and etc. As disclosed above for cleaners the semi-rigid gel article comprising at least one lubricant is contacted with a surface. The article can be placed on the surface and crushed or wiped on the surface. The wiping, or placing and crushing, action of the semi-rigid gel article against the surface to be lubricated provides sufficient compression to release the lubricating agent from the semi-rigid gel article to lubricate the surface. Continued wiping and compression reduces the gel solids to a very small residue that can simply be wiped off the surface and discarded on site. The residue is so small that it is inconspicuous if deposited either indoors or out-of-doors. In some embodiments, the residue is so small that the hard surface cleaner apparently dissolves as it is being used.

In still other exemplary embodiments, the semi-rigid gel article can be used to freshen breath and/or clean the teeth and/or mouth. Typically semi-rigid gel articles used for mouth cleaning has compressive strength, compressive modulus, and/or dynamic modulus that is on the low to mid range of the scale, typically in a range that is between about 0.8 kPa and about 45 kPa. In an exemplary embodiment, to clean the teeth and/or mouth the article is placed on the surface of the tongue and crushed or wiped against the roof of the mouth. In another exemplary embodiment, to clean the teeth and/or mouth, the article is contacted with the surface of the teeth with appropriate pressure and sufficient compression to release the cleansing agent from the semi-rigid gel article to clean the teeth. Continued contacting/wiping and compression reduces the gel solids to a very small residue that can simply be spit out or swallowed. The bacteria and food debris removed from the teeth and mouth are typically absorbed into the residue.

D. Packaging of Semi-Rigid Gel Articles

Semi-rigid gel articles are packaged in any convenient form known in the art. Indeed any suitable packaging can be used e.g., packaging as disclosed in U.S. Pat. No. 7,160,604, U.S. Pat. No. 3,809,220, U.S. Pat. No. 4,120,400 and U.S. Pat. No. 6,523,691. Typically, the packaging for a semi-rigid gel article resists air transmission so as to preserve the moisture content of the semi-rigid gel article. In some exemplary embodiments, several semi-rigid gel articles are packaged together, thus, providing multiple applications per container. In other exemplary embodiments, the semi-rigid gel article is packaged individually.

The following examples are offered to illustrate, but not to limit the invention.

EXAMPLES

Example 1

Preparation of Semi-Rigid Gels I

The following example illustrates an exemplary method for producing starch-based semi-rigid gels.

Materials

Unmodified wheat starch (Midsol 50) was purchased from the MGP Ingredients, Inc., (Topeka, Kans.), Dent cornstarch (Melojel) and high amylose corn starch (Hylon VII) were purchased from the National Starch and Chemical Company (Bridgewater, N.J.). Silicone oil (CAS registry No. 63148-62-9), 2-heptanone (CAS registry No. 110-43-0), acetone, glacial acetic acid and 2-propanol were purchased from the Sigma-Aldrich Co. (St. Louis, Mo.).

Starch Gel Preparation

Aqueous gels of wheat and Dent corn starches were prepared by heating a 10% (w/w) aqueous starch slurry to 90° C. and maintaining the temperature for 10 min with constant stirring. The starch melt was poured into a sheet mold (30× 40×0.7 cm), covered with aluminum foil and kept in a refrigerator overnight. The high-amylose corn starch (HACS) gel was made by heating a 10% (w/w) aqueous starch slurry to 140° C. and maintaining that temperature for 10 min. using a pressure reactor (Parr Instrument Co., Moline, Ill.). The melt was cooled to 70° C. and poured into a sheet mold, covered and refrigerated as previously described.

Starch gels containing silicone oil were made by removing the gels from the molds and equilibrating in a graded ethanol series (40, 70, 90% and three changes of 100% ethanol) to displace the water. Cylinders (2 cm dia.) were cut from ethanol-saturated gels and equilibrated in a 1:1 mixture of ethanol and silicone oil followed by equilibration in 100% silicone oil for 24 hrs each.

Example 2

Preparation of Semi-Rigid Gels Comprising Additives

The following example illustrates an exemplary method for producing starch-based semi-rigid gels comprising a fragrance e.g., lemon oil.

Gels prepared as in Example 1 above, are made by removing the gels from the molds and equilibrating in a graded ethanol series (40, 70, 90% and three changes of 100% ethanol) to displace the water. Ethanol-saturated gels are further equilibrated in a 1:1 mixture of ethanol and lemon oil for 24 hrs.

Example 3

Preparation of Semi-Rigid Gels II

The following example illustrates an exemplary method for producing agar-based semi-rigid gels.

A suspension containing 2% (w/w) agar (Bacto-Agar, Difco Laboratories, Detroit, Mich.) in distilled water is heated at 2° C./min in a 1000 ml pressure reactor (Paar Instrument Co., Moline, Ill.) equipped with a mixer and controller (Model 4843). The suspension was mixed at 330 rpm and heated to 100° C. resulting in a homogenous solution. The solution is then poured into molds and cooled to 60° C.

Solidified gels are removed from the molds and equilibrated in a graded ethanol series (40, 70, 90% and three changes of 100% ethanol) to displace the water. Further solvent exchanges are performed as necessary to achieve the desired final semi-rigid gel composition.

Example 4

Preparation of Semi-Rigid Gels III

The following example illustrates an exemplary method for producing alginate-based semi-rigid gels.

A mixture comprising 1% (w/w) alginic acid (alginate) in water is mixed and heated to 100° C. and cooled to 30° C. in a pressure reactor. The molten solution is poured into molds containing 1% $CaCl_2$ (w/w) solution and allowed to gel. Gels are treated by subjecting to a solvent exchange procedure as disclose above.

Example 5

Use of Semi-Rigid Gel Products I: Hand Sanitizers

The following Example illustrates the use of semi-rigid gel cleansing articles for cleansing the hands.

Semi-rigid gels formed as described in Examples 1, 2, 3 and/or 4 are used as sanitizing hand wipes.

Semi-rigid gel wipes are used to clean hands by wiping the wipe between the hands with rigor sufficient to provide compression for release of the cleaning liquids from the semi-rigid gel to clean the hands. Continued wiping and compression reduces the gel solids to a very small residue that can simply be wiped off the hands and discarded on site. In some cases the residue is so small that it apparently disappears or dissolves. If visible, the residue is so small that it is inconspicuous if deposited either indoors or out-of-doors. The residue itself contains much of the dirt and debris removed from the bands by the cleaning agent.

Example 6

Use of Semi-Rigid Gel Products II: Sanitizing Hard Surfaces

The following Example illustrates the use of semi-rigid gel wipes for cleansing the hard surfaces.

Semi-rigid gels formed as described in Examples 1, 2, 3 and/or 4 are used to sanitize/cleanse hard surfaces. Semi-rigid gel wipes are used to clean hard surfaces e.g., countertops, furniture, walls etc, by wiping the wipe rigorously on the soiled area of the hard surface e.g., on the area having a stain, mark, dirt, grime, germs, etc.

As in Example 5 above, continued wiping and compression reduces the gel solids to a very small residue that can simply be wiped off the hard surface and discarded on site. The residue is small that it is inconspicuous and comprises much of the dirt and debris removed from the surface by the cleansing agent.

Example 7

Use of Semi-Rigid Gel Products III: Sanitizing Clothing and Soft Surfaces

The following Example illustrates the use of semi-rigid gel wipes for cleansing the clothing and other soft surfaces.

Semi-rigid gels formed as described in Examples 1, 2, 3 and/or 4 are used to sanitize/cleanse soft surfaces. Semi-rigid gel wipes are used to clean soft surfaces e.g., clothing, coats, rugs, etc, by wiping the wipe rigorously on the soiled area of the soft surface e.g., on the area having a stain, mark, dirt, grime, germs, etc.

As in Examples 5 and 6 above, continued wiping and compression reduces the gel solids to a very small residue that can simply be wiped off the soft surface and discarded on site. The residue is small and is inconspicuous and comprises much of the dirt and debris removed from the soft surface by the cleansing agent.

Example 8

Measuring the Rigidity of a Semi-Rigid Gel

The following example illustrates an exemplary method for measuring the rigidity of semi-rigid gel articles.

Wheat starch Midsol 50 was purchased from the GMP (Atchison, Kans.) and cornstarch Melojel was purchased from National Starch Company, (Bridgewater, N.J.).

Starch gels containing 8% solids were cooked with constant mixing until they reached 90° C. The temperature was maintained at 90° C. for 5 minutes. The starch melt was transferred to a rectangular mold and allowed to set or gel overnight.

The gels were removed from the molds and cut with a cork borer #15 (20.7 mm in diameter) to form sample cylinders. These cylinders were immersed in water and in ethyl alcohol solutions of 30%, 60% and 90%. The solutions were replaced twice to make sure that the concentration of ethyl alcohol was maintained at the specified level. Total immersion time was 72 hours.

The prepared gels were deformed to 25% of the gel thickness by compression using an Instron Universal Testing Machine (model 4502, Instron Corp. Norwood, Mass.) equipped with 100 N load cell. The cross-head speed was 5 mm/min. The Load (kN), Stress (kPa) and Modulus (MPa) were calculated. Ten cylinders of each sample were tested for each treatment. The results are shown in tabular form in Table 1, and graphically in FIG. 1 and FIG. 2.

TABLE 1

| Sample | Load (N) | Std | Stress (kPa) | Std | Modulus (kPa) | Std |
|---|---|---|---|---|---|---|
| Corn gel in water, 0% Ethanol | 0.59 | 0.14 | 2.4 | 0.52 | 9.0 | 1 |
| Corn 30% Ethanol | 2.41 | 0.592 | 16.0 | 3.93 | 35.0 | 7 |
| Corn 60% Ethanol | 7.87 | 1.56 | 66.2 | 13.1 | 129.0 | 26 |

TABLE 1-continued

| Sample | Load (N) | Std | Stress (kPa) | Std | Modulus (kPa) | Std |
|---|---|---|---|---|---|---|
| Corn 90% Ethanol | 11.30 | 0.994 | 101.0 | 8.94 | 229.0 | 34 |
| Wheat gel in water, 0% Ethanol | 0.72 | 0.0451 | 3.0 | 0.188 | 10.0 | 1 |
| Wheat 30% Ethanol | 1.67 | 0.216 | 9.3 | 1.21 | 25.0 | 2 |
| Wheat 60% Ethanol | 4.26 | 0.217 | 30.7 | 1.56 | 88.0 | 5 |
| Wheat 90% Ethanol | 9.47 | 0.708 | 83.8 | 6.26 | 207.0 | 12 |

Example 9

Measuring the Rigidity of a Semi-Rigid Gel: Rheometry

The following example illustrates exemplary measures of the rigidity of semi-rigid gel articles expressed as dynamic modulus. Dynamic modulus is measured and calculated at room temperature (25° C.) using gels as disclosed in Example 8, by methods known in the art (see e.g., Barnes, Howard A., (2000) supra). The results are shown graphically in FIG. 3.

TABLE 2

| Alcohol (%) | Dent Corn G' (kPa) | Wheat G' (kPa) |
|---|---|---|
| 0 | 0.85 | 2.4 |
| 30 | 19.6 | 17.7 |
| 60 | 32.3 | 28 |

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A semi-rigid gel cleansing article comprising:
   (i) at least one gelling agent,
   (ii) at least one solvent, and
   (iii) an effective amount of at least one cleansing agent that is released from the semi-rigid gel article when sufficient compression is applied to the semi-rigid gel,
   wherein the at least one cleansing agent comprises a surfactant or a stain remover,
   wherein
   the semi-rigid gel cleansing article is of a sufficient mechanical strength to allow the entire gel to be picked up without breaking or smearing, and
   wherein
   the at least one gelling agent forms a solid matrix that is able to hold solids, liquids or solutions, and
   wherein
   the semi-rigid gel is at least partially filled with a liquid or solvent and the at least one cleansing agent.

2. The semi-rigid cleansing gel article of claim 1, wherein the at least one gelling agent is a member selected from the group consisting of starch, agar, alginate, protein, cellulose, silica, cellulose nitrate and alumina or a combination of such members.

3. The semi-rigid cleansing gel article of claim 1, wherein the gelling agent is starch.

4. The semi-rigid cleansing gel article of claim 3, wherein the starch is unmodified.

5. The semi-rigid cleansing gel article of claim 1, wherein the at least one solvent is a water miscible solvent.

6. The semi-rigid cleansing gel article of claim 5, wherein the water miscible solvent is an alcohol.

7. The semi-rigid gel cleansing article of claim 6, wherein the alcohol is present in an amount that is at least about 60% by weight.

8. The semi-rigid gel cleansing article of claim 7, wherein the alcohol is present in an amount that is about 70% by weight to about 90% weight.

9. The semi-rigid cleansing gel article of claim 6, wherein the alcohol is a member selected from the group consisting of a one carbon, a two carbon, a three carbon, and a four carbon alcohol or a combination of such members.

10. The semi-rigid cleansing gel article of claim 1, wherein the at least one cleansing agent further comprises a member selected from the group consisting of an antimicrobial, a disinfectant, a detergent or a combination of such members.

11. The semi-rigid cleansing gel article of claim 1, wherein the semi-rigid cleansing gel article further comprises at least one additive.

12. The semi-rigid cleansing gel article of claim 11, wherein the at least one additive is a member selected from the group consisting of a dye, a fragrance, a lubricant, and an abrasive or a combination of such members.

13. The semi-rigid cleansing gel article of claim 11, wherein the solid matrix comprises the at least one additive.

14. The semi-rigid cleansing gel article of claim 13, wherein the at least one additive is an abrasive.

15. A method for cleansing a surface comprising:
 (i) obtaining a semi-rigid gel cleansing article according to claim 1;
 (ii) contacting the semi-rigid cleansing gel article on the surface, thereby releasing the at least one cleansing agent;
 (iii) continuing contacting until the semi-rigid cleansing gel article degrades to small pieces, and
 (iv) removing the small pieces from the surface;
thereby cleansing the surface.

16. The method of claim 15, wherein the semi-rigid gel cleansing article has a dynamic modulus that is in a range that is between about 0.8 kPa and about 60 kPa.

17. The method of claim 15, wherein the surface is a member selected from the group consisting of human skin, animal skin, an article of clothing, and a hard surface.

18. The method of claim 16, wherein the dynamic modulus is in a range that is between about 0.8 kPa and about 35 kPa, and wherein the surface is human skin or animal skin.

19. The method of claim 15, wherein the effective amount of the at least one cleansing agent is an amount effective to produce a reduction in microorganisms on the surface.

20. The method of claim 16, wherein the dynamic modulus is in a range that is between about 35 kPa and about 60 kPa and wherein the surface is a hard surface.

21. The method of claim 15, wherein the at least one cleansing agent comprises at least one stain remover.

22. A method for lubricating a surface comprising:
 (i) obtaining a semi-rigid gel cleansing article according to claim 1, and an effective amount of at least one lubricating liquid or solution;
 (ii) contacting the semi-rigid gel cleansing article with the surface, thereby releasing the at least one lubricating liquid or solution;
 (iii) continuing contacting until the semi-rigid gel cleansing article degrades to small pieces;
 (iv) removing the small pieces from the surface;
thereby lubricating the surface.

23. The method of claim 22, wherein the contacting comprises wiping.

24. The method of claim 22, wherein the contacting comprises placing the semi-rigid cleansing gel article on the surface.

\* \* \* \* \*